(12) United States Patent
Kondylis et al.

(10) Patent No.: US 6,721,290 B1
(45) Date of Patent: Apr. 13, 2004

(54) METHOD AND APPARATUS FOR MULTICASTING REAL TIME TRAFFIC IN WIRELESS AD-HOC NETWORKS

(75) Inventors: George D. Kondylis, Santa Monica, CA (US); Srikanth V. Krishnamurthy, Calabasas, CA (US); Son Dao, Northridge, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/541,177

(22) Filed: Apr. 3, 2000

(51) Int. Cl.[7] .................................................. H04J 15/00
(52) U.S. Cl. ........................ 370/329; 370/338; 370/348
(58) Field of Search ................................. 370/229, 390, 370/319, 320, 321, 342, 344, 347, 329, 338, 348

(56) References Cited

PUBLICATIONS

C.E. Perkins, P. Bhagwat, "Highly Dynamic Destination–Sequenced Distance–Vector Routing (DSDV) for Mobile Computers", Proceedings of SIGCOMM'94.
A. J. Ballardie, P. F. Francis and J. Crowcroft, "Core Based Trees", in Proceedings of ACM SIGCOMM, 1993.
http://pcl.cs.ucla.edu/projects/parsec/.
J. Broch et al., "A Performance Comparison of Multi–hop Wireless Ad Hoc Network Routing Protocols", Proceedings of MOBICOM '98, 1998.
J. J. Garcia–Luna–Aceves, Ande. L. Madruga, "A Multicast Routing Protocol for Ad–Hoc Networks", in Proceedings INFOCOM, 1999.
P. P. White, "RSVP and Integrated Services on the Internet: a tutorial", IEEE Commun. Magazine, vol. 35, pp. 100–106, May 1997.

*Primary Examiner*—Kenneth Vanderpuye
(74) *Attorney, Agent, or Firm*—Tope-McKay & Associates (57) ABSTRACT

A real-time multicast scheduler method and apparatus is presented, to facilitate multicasting of real-time constant bit rate data in wireless ad-hoc networks. Constant bit rate traffic cannot tolerate delay jitter. However, a small amount of packet losses may be tolerable. In order to ensure the provisioning of a desired level of quality of service, bandwidth is reserved on the multicast structure. A goal of the real-time multicast scheduler is to avoid packet collisions and to facilitate color re-use, where "color" is defined as a channel selected as a combination of time-division multiple access, frequency-division multiple access, and code-division multiple access schemes. The real-time multicast scheduler provides a self-healing network which corrects for disconnections caused by node movement and nodes moving out of range of each other, while accounting for colors already assigned for data transmission in order to prevent packet collisions.

10 Claims, 8 Drawing Sheets

METHOD AND APPARATUS FOR MULTICASTING REAL TIME TRAFFIC IN WIRELESS AD-HOC NETWORKS

TECHNICAL FIELD

The present invention is related to network communications. More particularly, this specification discloses a method and apparatus for the generation and maintenance of a wireless ad-hoc network for multicasting real-time constant-bit-rate (CBR) data among a plurality of nodes.

BACKGROUND

Wireless ad-hoc networks consist of collections of "peer" mobile nodes, capable of communicating with each other, and forming a dynamically changing network with no infrastructure. In order to route packets to a destination node, each node in a wireless ad-hoc network uses other nodes in the network as relays. Therefore, it is desirable that the nodes in the network establish routing among themselves, and that the routes keep changing as the nodes move, or as the environment changes due to such factors as fading and interference. Many routing protocols have been proposed to enable effective routing in such an environment, examples of which are provided in the articles cited below. In particular, multicasting has received much attention in the Internet community. Most of the development in multicast protocols, however, has addressed wireline, fixed networks having static topologies, and are focused toward Internet applications. The majority of these Internet multicast protocols do not consider the issue of resource reservation, because the available bandwidth is generally not a problem in wireline networks. Recently, the Core-Assisted Mesh Protocol (CAMP) was proposed for effective wireless multicasting of datagram traffic. However, CAMP neither supports real-time traffic nor does it attempt to guarantee any level of quality of service (QoS). No protocol developed to date addresses multicast streaming of real-time data in a wireless ad-hoc network environment.

Most multicast protocols result in the formation of a multicast structure, which is used for transportation of multicast data. Some schemes utilize core nodes or rendezvous points, which are used to collect multicast data from sources (if there are more than one) and then to multicast the data from these nodes to the receivers. The structure built may have the form of a tree or a mesh.

QoS is currently a focal point of attention in both wireline and wireless networks. There are two major ideologies for delivering QoS guarantees: the integrated services model and the differentiated services model. The integrated services model attempts to provide a guaranteed notion of service, which involves reserving bandwidth from the source node to the destination node. RSVP is a signaling protocol, which supports reservation of resources for multicast sessions on the Internet, is part of the integrated services specification. On the other hand, the differentiated services model is based on assigning resources to a user or edge router on a quasi-static basis. The resource is thus reserved based on what is called a service level agreement (SLA) and is then used to carry multiple classes of data. Each class of data receives a particular quality of service in terms of per-hop forwarding at each router. While, the differentiated services model is much simpler to implement than the integrated services model, it does not provide strict end-to-end quality of service guarantees in terms of bandwidth or delay.

Presently, there is a need for a multicasting method and system that is capable of supporting real-time CBR data among the nodes of a wireless network. It is also desirable that the system be distributed, highly adaptive to variations, flexible, and scalable.

References:
1. C. E. Perkins and P. Bhagwat, "Highly dynamic Destination-Sequenced Distance Vector routing (DSDV) for mobile computers", *Proceedings of SIGCOMM'94*;
2. J. Broch et al, "A Performance Comparison of Multi-Hop Wireless Ad Hoc Network Routing Protocols", *Proceedings of MOBICOM'98*;
3. D. Waitzmann, S. Deering and C. Partridge, "Distance vector multicast routing protocol", *RFC*1075 (1988);
4. A. J. Ballardie, P. F. Francis and J. Crowcroft, "Core Based Trees", in Proceedings of ACM SIGCOMM, 1993;
5. J. J. Garcia-Luna-Aceves and E. L. Madruga, "A multicast routing protocol for ad-hoc networks", in *Proceedings INFOCOM*, 1999
6. P. Ferguson and G. Hutson, *"Quality of Service: Delivering QoS on the Internet and in Corporate Networks"*, John Wiley and Sons, Inc. 1998;
7. P. P. White, "RSVP and integrated services on the Internet: a tutorial", *IEEE Commun.* Magazine, vol. 35, pp. 100–6, May 1997; and
8. http://pcl.cs.ucla.edu/projects/parsec/.

SUMMARY

A real-time multicast scheduler method and apparatus is presented, to facilitate multicasting of real-time constant bit rate data in wireless ad-hoc networks. Constant bit rate traffic cannot tolerate delay jitter. However, a small amount of packet losses may be tolerable. In order to ensure the provisioning of a desired level of quality of service, bandwidth is reserved on the multicast structure. A goal of the real-time multicast scheduler is to avoid packet collisions and to facilitate color re-use, where "color" is defined as a channel selected as a combination of time-division multiple access (TDMA), frequency-division multiple access (FDMA), and code-division multiple access (CDMA) schemes. The real-time multicast scheduler provides a self-healing network which corrects for disconnections caused by node movement and nodes moving out of range of each other, while accounting for colors already assigned for data transmission in order to prevent packet collisions.

Provided is a method for bandwidth reservation for real-time traffic in a wireless ad-hoc network that includes a plurality of nodes transmitting and receiving data via a plurality of colors. The transmitting and receiving of the data is performed periodically with a data period p. Each one of the nodes has either a connected, disconnected, or a temporarily disconnected connection state, and the plurality of nodes includes a communication origin node from which a data transmission occurs. Each node is further defined as having a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node. In what follows, the identification of a node is denoted the node ID.

The reservation method comprises the steps of:
a. periodically transmitting a disconnected maintenance packet from each disconnected node, with each disconnected maintenance packet including the disconnected maintenance packet transmitting node ID, the node ID of a parent node from which disconnected node seeks to receive, the frame position fp of the disconnected maintenance transmitting node, and the color in which the disconnected maintenance packet transmitting disconnected node seeks to receive;
b. periodically transmitting a connected maintenance packet from each connected node, with each connected maintenance packet including the node ID of the connected maintenance packet transmitting node, the node ID of the parent node from which connected node is currently receiving, the frame position fp of the node transmitting the connected maintenance packet, the color in which the connected maintenance packet transmitting node receives, a set of the usable colors in which the connected node may transmit, and a set of unusable colors in which the connected node is prohibited from transmitting;
c. periodically transmitting a temporarily disconnected maintenance packet from each temporarily disconnected node, with each temporarily disconnected maintenance packet including the node ID of the temporarily disconnected maintenance packet transmitting node, the node ID of the parent node from which temporarily disconnected node seeks to receive, the frame position fp of the node transmitting the temporarily disconnected maintenance packet, the color in which the temporarily disconnected maintenance packet transmitting node seeks to receive, a set of the usable colors in which the temporarily disconnected node is transmitting, and a set of unusable colors in which the temporarily disconnected node is prohibited from transmitting;
d. receiving, at each particular node of the plurality of nodes, the maintenance packets from all nodes within a transmission range of the particular node;
e. using the maintenance packets received at each particular node to update the set of usable colors and the set of unusable colors for the particular node, where the set of usable colors for the particular node is defined as the complement of the set of unusable colors, and where the set of unusable colors of a first node Na having frame position fpa includes color ca if there is at least one other node Nb within transmit range of the first node Na, having frame position fpb, where Nb is not a child of node Na, where Nb receives at color ca, and where (fpa+1) mod p=fpb mod p where p represents the data period p; and
f. establishing data connections for the disconnected nodes Nd and temporarily disconnected nodes Nd, where a node Nd can connect to a node Nc with color cd within a transmission range of the node Nd, and with a minimum frame position fpc=fpd−1 only if node Nc can transmit at color cd, where color cd=color ca as determined in step e, and only if color cd is not a transmit color of any other node Nk with frame position fpk within the transmission range of the first node Nd, such that fpc mod p=fpk mod p where p represents the data period p;
g. periodically repeating steps a through f to update the ad-hoc network.

The method of the present invention further includes the provision of a wireless ad-hoc network having the characteristics described for use with the reservation method.

The apparatus of the present invention includes a wireless ad-hoc network structure developed and maintained by the reservation method described above as well as the supporting hardware, i.e. a plurality of wireless ad-hoc network having the characteristics described for use with the reservation method.

The term "colors" used herein in the method and apparatus of the present invention are channels developed from TDMA, CDMA, and FDMA schemes or from combinations thereof.

DETAILED DESCRIPTION

The present invention is useful for providing a method and apparatus for multicasting real-time traffic in wireless ad-hoc networks that facilitates real-time constant-bit-rate (CBR) data transmission among a plurality of nodes in a wireless ad-hoc network. It builds a multicast structure, and also includes a real-time multicast scheduler, which schedules packet transmissions to avoid collisions due to simultaneous transmissions.

The following description is presented to enable one of ordinary skill in the art to make and use the invention, which may be incorporated in the context of a variety of applications. Various modifications to the preferred embodiment, as well as a variety of uses in different applications will be readily apparent to those skilled in the art. Notably, the general principles defined herein may be applied to other embodiments. Thus, the present invention is not intended to be limited to the embodiments shown, but is to be accorded the widest scope consistent with the principles and novel features disclosed herein.

The environment in which the preferred embodiment of the present invention is designed to operate consists of a few nodes to a few hundreds of distributed wireless ad-hoc nodes. It is assumed that each node can communicate with a set of immediate neighbors, and that the network is strongly connected at all times. The present invention performs optimally when the nodes are slowly moving, i.e. at pedestrian speeds. It does function if the nodes are vehicular or otherwise high-velocity users, but the number of connection breaks increases with node speed, and may result in excessive connection breaks, resulting in the consumption of large amounts of overhead for connection re-establishment.

A focus of the present invention is the facilitation of multicast streaming of real-time CBR data in a wireless ad-hoc networks. The CBR traffic class cannot tolerate delay jitter. However, it may tolerate a small amount of packet losses. In order to ensure the provisioning of the desired quality of service (QoS) by controlling delay jitter, bandwidth is reserved on the multicast structure. The present invention performs the dual tasks of building the structure, and also, en route, reserving bandwidth within the structure. It relies on a fixed bandwidth allocation for each multicast session, and the allocated bandwidth is re-used as the multicast structure is built. As the structure is built, the protocol attempts to optimally stream multicast data to all multicast group members and to avoid packet collisions. Furthermore, the protocol is distributed, and no centralized control is required to provide bandwidth reservations. However, it is worth noting that for a particular application, the present invention could be used with a centralized control mechanism, in which case, each node would have to approach the centralized control mechanism to request bandwidth, and the bandwidth would then be allocated by the control mechanism. Unfortunately, higher latencies would result during the establishment of affiliations, and it would also be necessary to provide a mechanism to help release resources when nodes leave the mesh. For CBR calls, the required bandwidth is reserved on each branch of the multicast structure as the structure is being built. The assumed sessions are similar to Internet multicast sessions, wherein the source is multicasting a session and the onus is on the receivers to join the session. Since the method is receiver initiated, the amount of overhead incurred in terms of signaling packets is low because the multicast control messages do not have to include significant routing information. The amount of information that needs to be exchanged between nodes is independent of the number of nodes comprising the ad-hoc network. Because the present invention makes reservations in terms of codes, time-slots, or frequency channels (or a combination thereof), reservations are made and maintained at the medium access control layer, as opposed to the IP layer. Thus, the overhead incurred is much lower. Furthermore, the inherent broadcast nature of the wireless channel is exploited to implicitly maintain soft-state updates (periodic updates of affiliation information), as opposed to explicit updates, which are required if RSVP is used. This low overhead is in contrast to the overhead incurred by traditional bandwidth reservation methods such as RSVP, which function at the networking (IP) layer. The low overhead is especially attractive in a wireless environment, wherein bandwidth is expensive and it is desirable to keep the overhead as low as possible. The method also has an inherent self-healing feature i.e., it recovers from link/node failures (due to mobility/jamming) in a fast and efficient manner.

It is to be noted that the mobility of the nodes and the harshness of the time-varying environment make it impossible to provide deterministic quality of service guarantees all of the time. The real-time multicast scheduler enables the provisioning of a coarse level of quality of service (QoS). However, once bandwidth is reserved on a particular multicast structure for a given call, the call enjoys sustained bandwidth until, and unless, a node en route fails or moves away. Thus, for pedestrian environments, short duration (of the order of tens of minutes) real-time calls can be supported. Typical applications that might benefit from such a resource reservation include important real-time calls consisting of both audio and video multicast sessions. The real-time multicast scheduler can reserve bandwidth in terms of time, frequency, and/or code, and is therefore flexible enough to be overlaid on top of any medium access protocol.

Multicasting real-time packets with real-time QoS guarantees is a complex problem. Due to simultaneous transmissions of nodes in a multicast tree or mesh structure, some of the multicast group members might not receive any packets. To illustrate, an example of a multicast mesh is presented in FIG. 1, with the nodes represented by a plurality of circles, and their interconnections represented by lines with arrows. In the mesh structure shown, if multicast member nodes 1, 2, and 3 transmit simultaneously, where node 1 is transmitting to relay the multicast information to node 5, a collision occurs at node 6. Thus, node 6, and therefore the part of the mesh which relies on node 6 for receiving multicast data, fail to get any multicast packets. It is therefore necessary that a scheduling method be used in order to help avoid packet collisions. Thus, to provision QoS for real-time traffic, multicast routing and scheduling should be optimized jointly.

In order to assist in the explanation of the present invention, several definitions are necessary. "Color" is used as a generic term for the specific bandwidth resource used by each node to receive and transmit packets. For example, in a FDMA system colors denote the frequency bands used by nodes for reception and transmission, in a TDMA system colors denote time slots, and in a CDMA system colors denote different codes. In embodiments using hybrid systems (e.g. FDMA/TDMA), colors denote the different combinations of bandwidth resource (e.g. frequencies/time slots) that could be used by each node. The "periodicity", p, of transmissions is defined as the number of frames between successive transmissions of a node. It is important to note that the minimum periodicity is two because it is assumed that a node cannot transmit while receiving. Note that it is possible for a node to transmit and receive at the same time in different colors. However, it is desirable to re-use colors as much as possible (to maximize the set of usable colors) so that other colors may be used for other multi cast sessions or applications. If any of the node's children is transmitting using the same color, then the node cannot transmit at the same time as its child. Hence, in this case, the periodicity would be three. Since it is a goal of the present invention to provide CBR traffic, the periodicity of the source is fixed for a specific multicast session, and is determined by the rate at which the source intends to transmit. "Frame position" (fp) is defined as the first frame number (the source is considered, for convenience herein, to always transmit in frame number 0) in which the node can transmit a packet. It refers to the relative transmission time of a node in terms of frames with respect to the source node's transmissions. Note that the frame duration depends upon the frequency with which a CBR source transmits data and the end-to-end delay requirements. Thus, frame position is a system parameter that may be set as necessary for a particular implementation. Frame positions are noted in the mesh shown in FIG. 1.

Each node is represented in the system by a quartet of information, Q, which consists of its frame position, its receive color (the color in which the node is currently receiving), and a set of unusable colors, i.e. each node is represented by Q={fp, Rx, Tx, UC}. In the quartet Q,fp denotes the frame position, Rx denotes the periodicity, Tx denotes the set of transmit colors, and UC denotes the set of unusable colors. It is possible that any or all of the Tx and Rx sets may be empty sets.

The goal of the multicast scheduler is to create a mesh such that each node successfully receives the packet stream. Note that depending on their frame positions, different nodes will receive the same multicast packet stream at different times. It is a further goal of the multicast scheduler to create a mesh such that the number of colors and the maximum number of hops required to reach a leaf in the multicast structure are minimized. From these definitions, it follows that a given node N0 with frame position fp0 and a transmit color of c0 will jam upon transmission, the reception of any node in its neighborhood that has frame position fp0+1, receives at color c0, and is not the multicast child of node N0. The neighborhood of a given node is defined herein as the set of nodes that are one hop away from the given node. Since transmissions from node N0 are periodic and occur every p frames (i.e. node N0 transmits in frames fp0,fp0+p, . . . ), it is easy to see that node N0 will also jam nodes with frame positions fp0+p, fp0−p,fp0+2p,fp0−2p, . . . , that are within direct receiving range of the node N0 and that receive at color c0. Therefore, a first scheduling rule may be stated as follows:

Rule 1: A node N0 with frame position fp0 cannot transmit with color c0 if there is at least one node Nj in its neighborhood, with frame position fpj, such that node Nj is not a multicast child of node N0, receives at color c0 and:

$$(fp0+1) \bmod p = fpj \bmod p.tm \quad (1)$$

A node N0 wishing to join the multicast session will try to become the multicast child of a node in its neighborhood that has the minimum frame position (so that the number of hops from the source is minimized), and that can accommodate node N0 as a child with a color c, such that node N0 is not jammed by other nodes. The second scheduling rule is thus stated as follows:

Rule 2: A node N0 can connect to a node Nj in its neighborhood, with a color c0, and with a minimum frame position fpj=fp01 (hence node N0 has frame position fp0) if and only if node Nj can transmit at color c0, as determined from Rule 1, AND color c0 is not a transmit color of neighboring nodes Nk (k being different from j) with frame positions fpk, such that:

$$fpj \bmod p = fpk \bmod p. \quad (2)$$

Figure 1:
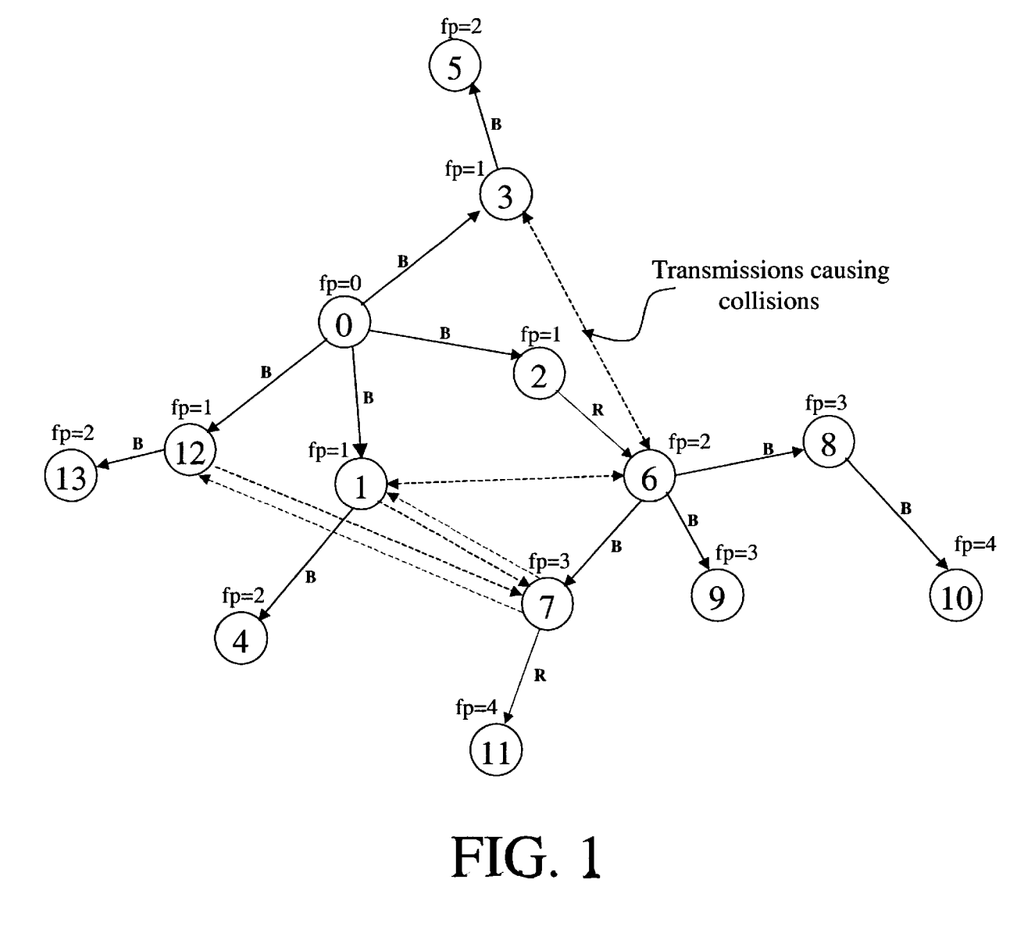
FIG. 1 is an example of a multicast mesh which comprises a plurality of nodes, and for which the method of the present invention provides real-time multicasting.

FIG. 1 may be viewed with the assumption of a periodicity of p=3, and two colors, A and B. It may be seen that for the indicated frame positions, routing using a single color cannot take place. Specifically considered is the case where nodes 1 and 3 use color A to relay packets to nodes 4 and 5 respectively. Node 2 is not constrained by Rule 1 to transmit with color A, since it does not jam any node satisfying equation (1) above. However, node 6 cannot receive in color A from node 2, since there are two other nodes (node 1 and node 3) transmitting with color A, which satisfy equation (2) above. Therefore, node 2 has to use a second color (e.g. B) to relay packets to node 6. The multicast tree, created by using the two colors is shown in FIG. 1.

Consider next the case of nodes 7 and 11. Node 7 is the only one able to forward packets to node 11, but if it does so using color A, it will jam the receptions of nodes 1 and 12. Indeed, it can be readily observed that the frame positions of neighboring nodes 1, 12, and 7 satisfy equation (1) above. Therefore, node 7 will also have to transmit using color A in order to avoid causing interference to the receptions of nodes 1 and 12. The multicast tree that succeeds in forwarding packets, collision free, to all members of the multicast session is shown in FIG. 1. Next, a narrative description of the present invention is provided.

Narrative Description of the Present Invention

The multicast source advertises its session, which is then flooded through the network. Nodes that receive this flood message re-broadcast the message once. Other nodes might subscribe to a multicast session by sending a join request. A core, or rendezvous point, is defined, towards which join requests may be sent. The multicast mesh may consist of several cores. When a node, for example node 10 of FIG. 1, wants to join the multicast group, it transmits a beacon packet that is received by all of its neighbors. The neighbors that are already a part of the multicast mesh acknowledge this beacon. The acknowledgement contains the quartet associated with the joining node, as well as the identification of the acknowledging nodes. If none of the neighbors are members of the multicast mesh, the node initiates a route search. When a useable route is discovered, the node sends a beacon along the discovered route. The beacon is then relayed along the route until it reaches a node that has a neighbor belonging to the multicast mesh. This node then tries to attach itself to the mesh by broadcasting the beacon. If the node attaches itself to the mesh, then all the nodes along the route to the requesting receiver are forced to become members of the multicast mesh. Next, the mechanism by which a node attaches itself to the multicast mesh when at least one of its neighbors is a multicast member is presented. Note that if there is no path available to the existing multicast mesh, the node cannot join the mesh.

The scheduling method is derived naturally from previously defined rules (1) and (2), wherein rule (1) provided the concept of unusable colors (i.e. those colors that a node cannot use without jamming the reception of some other neighboring node); and rule (2), together with the fact that the method is a receiver initiated protocol, enunciates the connection procedure which will be explained next.

Let C denote the set of available colors. When a node (termed node I), that wants to join the multicast mesh for the first time, gets acknowledgements from those neighbors that are members of the multicast mesh (defined herein as multicast mesh neighbors), it examines each received quartet, $Q_i = \{fp_i, Rx_i, Tx_i, UC_i\}$. Node I, first collects the quartets containing the smallest frame position, e.g. fp1, as well as fp1 modulo p, for which the transmit color set Tx is not empty (i.e. the corresponding node is a relay). This last requirement comes from the fact that nodes with frame position fp1 mod p, could jam transmissions from nodes with frame position fp1, and is a direct consequence of rule (2). This refined set of Qi is termed F. The node then, examines the transmit color set Tx in each of the quartets belonging to F. The earliest node I can receive multicast packets is in the frame fp1. One of the nodes from the set F with frame position fp1 will have to adopt node I as a child. If a color cl, among the set of transmit colors of the nodes in F, is unique and the corresponding node has frame position fp1, then node I sets its receive color Rx to c1. It also sets its transmission color set to null or empty. This essentially means that this node I does not have any transmission color at this time and is not involved in the multicast data forwarding. Furthermore, node I also sets its frame position to ft1+1. It also informs its new 'parent node' that it is now a child of that node.

Now, taking the case where a unique transmit color does not exist among the nodes in F, node I then finds the set of remaining colors RC. It follows that the set of remaining colors RC=C−U{Txi}, where U denotes the union of all the transmit color sets in F. Subsequently, it keeps only the subset of F that contains nodes with fp=fp1, termed the subset F1. If the set of remaining colors RC is not empty, for each of the colors in the set of remaining colors RC, node I examines whether there is a node in F1 that does not contain the color in its unusable color set. Let node J be such a node, that is, there exists a color c in the set of remaining colors RC that is not included in the set of unusable colors UC of node J. Then, node I can send a message to node J requesting it to transmit on the color c. Node J will add the color c to its transmit color set Tx, and will consider node I as its child. When the other nodes in the neighborhood of node I, with frame positions equal to fp1 (mod p) hear the same message, they recognize that the color c is a color that can no longer be used by them for transmitting (since this would then result in a collision at node 1). So they add the color c to their set of unusable colors UC. This is a direct consequence of rule 1. Alternatively, node J can choose to switch one of its transmit colors to the color c (in order to do so, node J must consult its children that are receiving multicast data by means of the color to be switched). This is required to ensure that none of these children are being jammed if the proposed color c is used. Of course, any node J can receive periodic information from a child about the colors that this child cannot receive on, due to jamming effects. This will speed up the decision making process at a node when it is requested to switch colors.

If the set of remaining colors RC is empty, or if all of its elements belong to all of the unusable color sets UC of neighbors in frame position fp1, node I cannot connect at frame position fpt1+1. It might, however, attempt to receive packets from a node which belongs to frame position fp1+1 or greater. Then, it would go through the same process as described earlier considering a new refined set F', which will have a definition similar to the definition for set F, but with frame position fp1+1.

Due to the harsh characteristics of the wireless environment, it is expected that links will vary with time, even for stationary nodes. Nodes that lose connection with the multicast mesh will have to renegotiate resources (colors) with those neighbors that are still a part of the multicast structure. In addition, due to the fading nature of the wireless channel, links may appear where they did not exist before. For that reason, and for ensuring that nodes that are already part of the session are not jammed, the receive color Rx is included in each node's quartet which will be periodically broadcasted by each node. Thus, when a new link appears, nodes will update their sets of unusable colors, according to rule (1), so that they do not jam the reception of newly appearing neighbors. Finally, note that, through the method of the present invention, each node that connects to the multicast tree will do so such that it is at the minimum possible number of hops from the source (i.e. will have the smallest possible frame position fp).

When a receiver no longer receives multicast packets from its parent, it senses that something has gone wrong and attempts to re-establish an affiliation. Alternate routes to the mesh or core might be cached and used when the primary route fails due to node failure/mobility. However, resources will have to be negotiated as before on the new route. Thus, it is the responsibility of the receiver to re-establish multicast affiliation when intermediate nodes fail or move. Based on prior information about nodes that are in the same frame position as that of the original parent, a receiver may initially attempt to reconnect at the same frame position. If this is possible, the multicast structure below the particular receiver need not be rebuilt. The children of that receiver will have a temporary disruption in service, i.e., will not receive packets temporarily. The receiver might explicitly indicate this to its children or time-outs might be set appropriately to ensure that they stay connected. If the parent receiver node cannot reconnect at the same frame position as before, its children, and subsequently, their descendents will time-out, and will have to find alternate ways of attaching themselves to the multicast structure.

Due to node movement, jamming could result, i.e., there might be color clashes as different nodes move in and out of range of each other. Therefore, each node should broadcast periodically its transmission schedule (Tx and fp) as well as its receive color Rx for the benefit of nodes which have moved to within its vicinity. A node that receives a schedule message with a receive color Rx that is not yet in its UC, from a node with its frame position satisfying equation (1), first tries to put this receive color Rx in its UC. This is feasible only if Rx is not already in the transmit color set of the node. By adding Rx to UC, the node will refrain from jamming the new neighbor in the future. If Rx already belongs to UC, the new neighbor will be jammed and the two neighbors will attempt separately to reconnect to the multicast mesh.

Detailed Description of the Method of the Present Invention

Notations: In the details of the method as described below, the following notations are used:

myfp=the frame position of the node under consideration;
myid=the unique id of the node under consideration; and
U: Union of sets of individual elements (for example colors).

Finally, it is assumed that there is a one to one mapping between colors and integers. That is, different colors are denoted by different integer numbers, $1,2,\ldots,N_c$, where Nc is the total number of colors. In what follows it is further assumed that there is a reliable signaling channel (e.g. TDMA time slots shared in a round-robin fashion). This is used for exchanging multicast control messaging. It is important to note that other multiple access techniques could also be used for signaling.

a. Modes of Operation

Three modes of operation may be defined for each node, with respect to the multicast session:

1. Connected state (C), wherein the node is a member of the multicast tree and can receive and transmit data packets;
2. Disconnected (D), wherein the node is not a part of the multicast tree. It does not receive or retransmit data packets. This is the state of a node before joining the multicast session for the first time, or after the node fails to reconnect to the session, from state TD; and
3. Temporarily Disconnected (TD), wherein the node did not receive the latest (pre-specified number of) data packets'in its frame position and color, but a timer that would take the node to the disconnected state D has not expired yet. Note that the timing toward the disconnected state D may count in terms of data packets or in terms of time. In this case, in the next frame, the node will explicitly inform its children of its state in order to keep them in connected state. During the next signaling period, the node will attempt to reconnect to a neighbor having a frame position equal to that of its previous parent. While in state TD the node is still considered to be part of the multicast tree.

Figure 2:
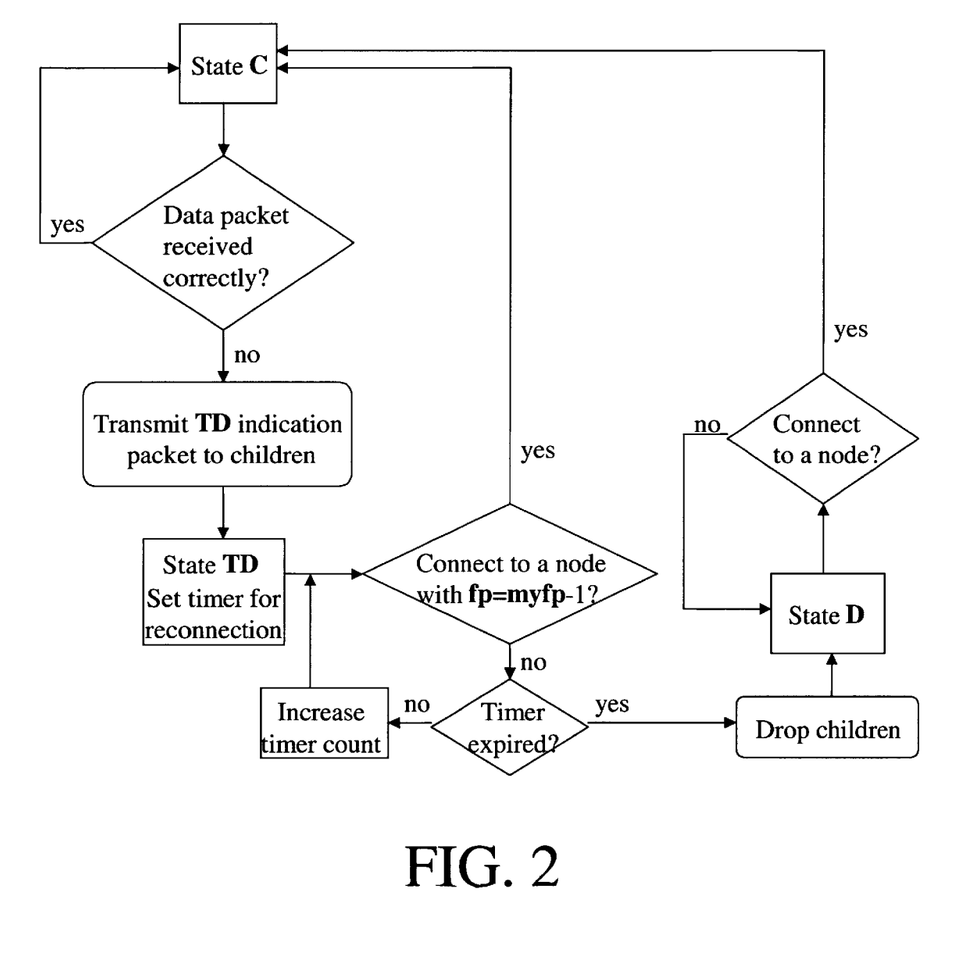
FIG. 2 is a state-transition flowchart which diagrams the method of the present invention.

A flowchart illustrating the state transitions between the three states just described is shown in FIG. 2. At each state, a node periodically broadcasts signaling packets in order to allow its neighbors to update their databases (i.e. update the set of their neighbors, the set of unusable colors etc., as detailed below) or to attempt to connect to the multicast session. Signaling can be implemented with specific time slots inserted, for example, periodically in TDMA frames (or any other color-type), or through a separate dedicated signaling channel. Any reliable multiple access algorithm can be implemented for the signaling channel, such as round-robin or Slotted-Aloha with acknowledgements or request-to-send/clear-to-send (RTS/CTS) based protocols. In the following subsections, the messages being exchanged between nodes, as well as the information each node maintains for multicasting purposes are described. Then the sequence of signaling in each of the three states C, D, and TD is explained.

b. Signaling Information Exchanged Between Nodes

Nodes in states C or TD exchange maintenance packets mp having the following fields:

mp.id: The node's unique identification;

mp.pid: The node's parent identification;

mp.fp: The node's frame position;

mp.Rx: The node's receive color;

mp.Tx: The node's set of transmit colors, mp.Tx[i]=Tx[i], i=1:N_Tx, N_Tx is the number of transmit colors used by the node; and mp.U: The node's set of unusable colors, mp.U[i]=UC[i], i=1:N_UC, N_UC is the number of unusable colors of the node.

Observe that each maintenance packet mp contains the quartet Q defined earlier plus the identification of the sending node and the identification of the sending node's parent node. Nodes in state D transmit connect messages (con) with the following fields:

con.id: Requesting node's identification;

con.pid: Identification of node that is requested to become the current node's parent node;

con.fp: The frame position of the requesting node; and con.Rx: Requested receive color.

Since the multicast session is built from receiver-initiated requests, it is not necessary that the messages being exchanged contain extensive routing information and thus the protocol is completely scalable. Note that nodes need to only know about their neighborhood nodes. Note that it is possible for the session to be built from transmitter-initiated requests as well, and it is also possible to force the receivers to become members of the multicast mesh.

The amount of information included in signaling packets may increase only with an increase in the number of available colors. In other words, the length of vectors mp.Tx and mp.U may increase with the number of colors. However, the number of colors allocated for a multicast session will typically be small.

c. Information Maintained by a Node

All nodes have knowledge of their immediate neighbors that participate in the multicast session, i.e., nodes that are in state C. For these neighbors, each node maintains a database containing the unique identification (ID) of the neighbor and its parent, the neighbor's frame position, the neighbor's receive, transmit, and unusable colors, and the latest time the neighbor sent a maintenance packet mp. This information is obtained through the maintenance packets mp, which are periodically broadcasted by nodes in state C.

Note that the above information is included in the quartet defined earlier, and is augmented only by the unique identifications of each node and its parent.

Nodes in state C and TD also need to maintain information about their children and the colors they use to transmit data to each one of them. Specifically, each node preferably maintains the following data structures:

1. Neighborhood of node, NB:

NB.N: Number of one-hop neighbors;

NB.id: A vector with the unique ids of one hop neighbors, NB.id[i], i=1:NB.N;

NB.pid: A vector with the unique ids of the parents of one hop neighbors, NB.pid[i], i=1:NB.N;

NB.fp: A vector with the frame positions of one hop neighbors, NB.fp[i], i=1:NB.N;

NB.Rx: A vector with the receive colors of one hop neighbors, NB.Rx[i], i=1:NB.N;

NB.N_Tx: A vector indicating the number of transmit colors of each neighbor, NB.N_Tx[i], i=1:NB.N;

NB.N_U: A vector indicating the number of unusable colors of each neighbor, NB.N_U[i], i=1:NB.N;

NB.Tx: A matrix tabulating for each neighbor its transmitting colors, NB.Tx[i][i], i=1:NB.N,j=1:NB.N_Tx [i];

NB.U: A matrix tabulating for each neighbor its unusable colors, NB.U[i][j], i=1:NB.N,j=1:NB.N_U [i]; and NB.t: A vector indicating the latest time each neighbor sent an update message, NB.t[i], i=1:NB.N.

2. For nodes in states C or TD, multicast children database L:

L.N: Number of multicast children;

L.id: A vector with the ids of the node's children, L.id[i], i=1:L.N;

L.c: A vector containing the colors used to transmit to the corresponding children, L.c[i], i=1:L.N; and L.t: A vector indicating the latest time the i-th child sent an update message. Since each child is also a one hop neighbor, this time will also be contained in NB.t.

3. For nodes in states C or TD, a database of unusable colors UCS. The database of unusable colors UCS is derived from NB.Rx and any connect messages that are received by the node, such that the frame positions of their transmitting nodes satisfy equation (1):

UCS.N: Number of unusable colors;

UCS.U: A vector of unusable colors, UCS.U[i], i=1:UCS.N:

$$\text{UCS.U}=\{NB.Rx[i], \ i \ s.t.(myfp+1)\bmod p=NB.fp[i]\bmod p\}\cup\{con.Rx, \\ s.t. \ (myfp+1)\bmod p=con.fp \bmod p\}; \text{ and} \quad (3)$$

UCS.t: A vector indicating the latest time the corresponding color was add to UCS.

From the data structures above, nodes in states C and TD can infer their transmit colors (Tx=U {L.c}) as well as their unusable colors (UC=UCS.U), to be included in the maintenance packet mp.

Since nodes may move out of range or links may fade for prolonged periods of time, each node uses the time stamps on its neighbors and children lists (NB and L) to remove those entries that fail to send a maintenance packet mp for a preset period of time. Thus, both the transmit and the unusable color sets are regularly renewed to reflect current network conditions in the neighborhood of the node.

d. Signaling in the Connected State (State C)

If, within a preset time-out interval, at least one data packet is received successfully, the node remains in state C and during the following signaling interval, broadcasts a maintenance packet mp, as defined above. Note that a node can also receive an explicit notification in case its parent did not receive the corresponding data packet correctly. This will be considered a successful reception, and the parent node is assumed to be temporarily disconnected. During the next set of signaling slots, the node receives similar maintenance packets mp from its neighbors in state C. Based on these maintenance packets mp, the node can update its neighborhood status, i.e. determine which nodes, one hop away, are in state C. Additionally, the node updates its unusable color database UCS, by adding newly appearing colors or removing timed out colors.

The signaling methodology is captured by the following pseudo-code:

```
if (RoundRobinSignalingSlot==MySignalingSlot)
   BroadcastMaintenancePacket(mp);
else
   Receive(Control Packet mp) {
   UpdateNeighborDataBase(NB,mp,t_now);
   }
   or Receive(Connect Packet con) {
      if(con.pid==myid)
         if(con.Rx not in UC)
            AddChild(L, con, t_now);
         endif
      else
   if((myfp+1)modp==con.fp modp AND con.Rx not in Tx)
   AddUnusableColor(UCS, con.Rx, t_now);
      endif
      endif
   }
endif
UpdateChildren(L, t_now);
UpdateUCS(UCS, NB, t_now);
UpdateTx(Tx, L.c);
UC=UCS.U;
```

Upon reception of a connect (con) message, the receiving node checks the field con.pid. If the receiving node is the destination of the message, the node will add the requesting node as its multicast child, but only if the requested connect color is not in its unusable color set. If the con message is not addressed to the receiving node, the node will check whether the frame position of the requesting node and its own frame position satisfy equation (1). If so, and if the requested connect color does not belong to its transmit color set, the node will add it to the unusable color database UCS. Note that if the case arises, whereby the requested connect color coincides with one of the transmit colors of the node, there will be a collision of packets at the requesting node, which, because of the collision, will not be able to connect to the multicast mesh. During the UpdateChildren( . . . ) procedure, the node will remove any children that have timed-out (i.e. that have not sent update messages for a pre-determined period of time) from its children list L. During the UpdateUCS( . . . ) procedure, the node will add unusable colors to its UCS based on the updated neighborhood data base NB and equation (3). It will also remove from the database, unusable colors which have timed-out. During the UpdateTx( . . . ) procedure, the transmit colors are simply updated based on the received colors of the children in the node's database. If the node does not receive a data packet correctly within a preset time-out interval, the node goes to the state TD, and initializes a timer.

e. Signaling in the Temporarily Disconnected State (TD)

In the TD state, a node does not transmit maintenance packets mp during the signaling period, as previously defined. However, it collects maintenance packets mp from other nodes that are in a connected state, and based on these messages, it tries to find a node with a frame position equal to that of its parent, and attempts to acquire that node as its new parent. The pseudo-code below illustrates the TD state:

```
if (RoundRobinSignalingSlot==MySignalingSlot)
   ObtainSubNeighborhood(NB, NB1, NB2, myfp-1);
   TryUniqueColor(NB2, myfp-1, ok, parent, color);
   If (not ok)
      TryAddingColor(NB1, myfp-1, ok, parent, color);
   endif
   if (ok)
      con.id=myid;
      con.pid=parent;
      con.Rx=color;
      con.fp=myfp;
      BroadcastConnectMessage(con);
   endif
else
   Receive(Control Packet mp) {
   UpdateNeighborDataBase(NB, mp, t_now);
   }
   or Receive(Connect Packet con) {
      if(con.pid==myid)
         DoNothing( );
      else
      if((myfp+1)modp==con.fp modp AND con.Rx not in
         Tx)
         AddUnusableColor(UCS, con.Rx, t_now);
         endif
         endif
   }
endif
UpdateChildren(L, t_now);
UpdateUCS(UCS, NB, t_now);
UpdateTx(Tx, L.c);
UC=UCS.U;
```

During its own signaling slot, the node will try to reconnect to the multicast tree. The ObtainSubNeighborhood( ) routine simply finds the subsets NB1 and NB2 of NB with NB.fp[i]=myfp-1, and NB.fp[i]=myfp-1 modp respectively, and which satisfy equation (2). Subsequently, the routine TryUniqueColor( . . . ), examines the transmit colors NB2.Tx, and tries to find a unique one among them, the transmitting neighbor of which has frame position NB2.fp[i]=myfp-1. If such a unique color is not found, the routine TryAddingColor( . . . ) will check, one by one, all of the remaining colors to see whether there exists any color that does not belong to at least one of the sets NB1.UC[i]. If either procedure is successful, the node will generate a connect message with the corresponding parent node's identification and it will broadcast it. During signaling slots that the node does not transmit in (in which the node receives information), the node collects maintenance packets mp. However, if a connect message is directed to it, it ignores the message. Since it is uncertain whether the node will be able to reconnect to the session, the node should not add any new nodes as its multicast children.

f. Signaling in the Disconnected State (D)

Signaling at state D is essentially the same as that of state TD, the exception being that the disconnected node will go through all its neighbors' maintenance packets mp and will try to connect to any of them, irrespective of frame position.

Of course, the connection procedure begins by considering neighbors with the minimum fp possible. Any connect messages received by a disconnected node are ignored. The pseudo-code is shown below:

```
if (RoundRobinSignalingSlot==MySignalingSlot)
   fp=GetMinFramePosition(NB);
loop: ObtainSubNeighborhood(NB, NB1, NB2, fp);
   TryUniqueColor(NB2, myfp-1, ok, parent, color);
   If (not ok)
      TryAddingColor(NB1, myfp-1, ok, parent, color);
   endif
   if (ok)
      con.id=myid;
      con.pid=parent;
      con.Rx=color;
      con.fp=myfp;
      BroadcastConnectMessage(con);
      return;
   else
      fp=fp+1;
      goto loop;
   endif
else
   Receive(Control Packet mp) {
      UpdateNeighborDataBase(NB, mp, t_now);
   }
   or Receive(Connect Packet con) {
      DoNothing( );
   }
endif
```

Effects of the Method of the Present Invention for Signaling

The discussion of the method above assumed that the underlying MAC protocol for signaling provides reliable transmission of control messages. Furthermore, a round-robin slot allocation for signaling slots was assumed in order to prevent collisions of maintenance packets mp. This particular signaling scheme is not scalable. Other MAC protocols such as such as Aloha with ACKs or RTS/CTS may also be implemented for signaling. If such protocols are deployed, control packet collisions cannot be avoided. In order to protect nodes that are connected to the multicast structure, their update messages have to be transmitted reliably. Using acknowledgments and appropriately setting time-outs will achieve this goal of reliability.

Extensions for the Co-Channel Interference Case

In the preceding discussion, it was assumed that color clashes could occur only between neighboring nodes i.e., when two neighboring nodes transmitted simultaneously using the same color, their transmissions may collide. However, in the wireless environment, other nodes, more than one hop away, can contribute to the co-channel interference that a node's transmission experiences. Below, the method for accounting for co-channel interference is described.

Performance of an Embodiment of the Present Invention

The present invention was tested under simulated conditions. The following modeling assumptions were used to test the present invention. It was assumed that all nodes transmit using the same power, $P_T$. The power received by a node 0 when another node j transmits is given by $P_{j0}=G_{j0}P_T$, where $G_{j0}$ denotes the power attenuation on the path between nodes 0 and j. It was further assumed that $G_{ij}$ follows a simple power decay law, i.e. $G_{ij}=d_{ij}^{-\eta}$, where do is the distance between nodes i and j and $\eta$ is the power loss exponent. The signal to interference ratio as seen by node j's transmission at node 0 is given by:

$$SIR = \frac{G_{j0}}{\sum_{i \neq j} G_{i0}} \quad (4)$$

where nodes i transmit in the receive color of node 0 and their frame positions satisfy equation (1). A packet is received correctly if its signal to interference ratio, SIR, is above a certain threshold γ. Finally, it is assumed that a node can only connect to nodes that are within a maximum distance of $d_{max}$. This distance depends on the transmit power $P_T$. Note here that, the larger the transmit power $P_T$, the fewer relays will exist in the multicast mesh and the required bandwidth will be smaller. On the other hand, with smaller transmit power more nodes will need to retransmit packets, and bandwidth requirements will also increase. Rule 2, defined earlier, must be adjusted to include the additional requirement that in order for node 0 to connect to node j, the SIR at node 0, as defined from equation (4), must satisfy SIR≧γ.

Figure 3:
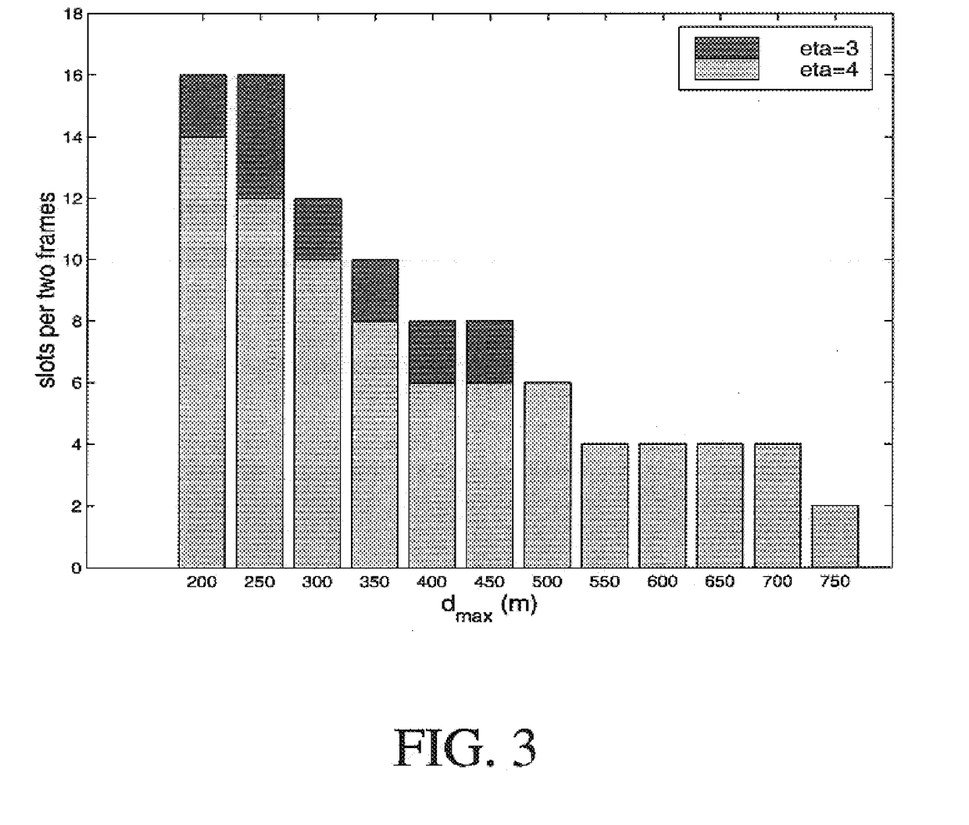
FIG. 3 is a bar graph, which provides experimental results from one hundred different node positions, showing the averaged number of colors (slots) required to connect all of the nodes to the multicast mesh as a function of the maximum transmission range $d_{max}$.
Figure 4:
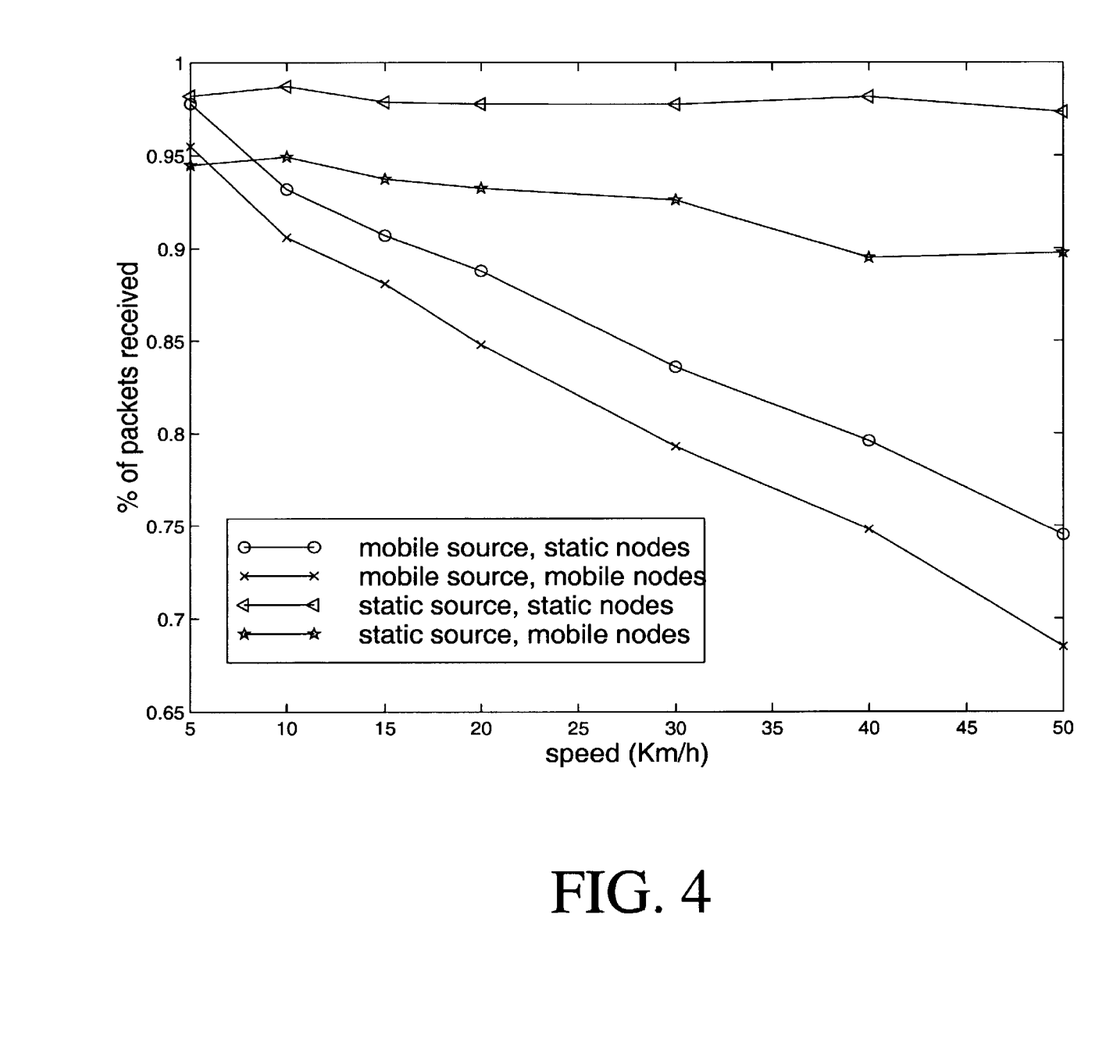
FIG. 4 is a line graph, which provides experimental results for different combinations of static and mobile nodes and sources in terms of mobility speed versus the percentage of data packets received.
Figure 5:
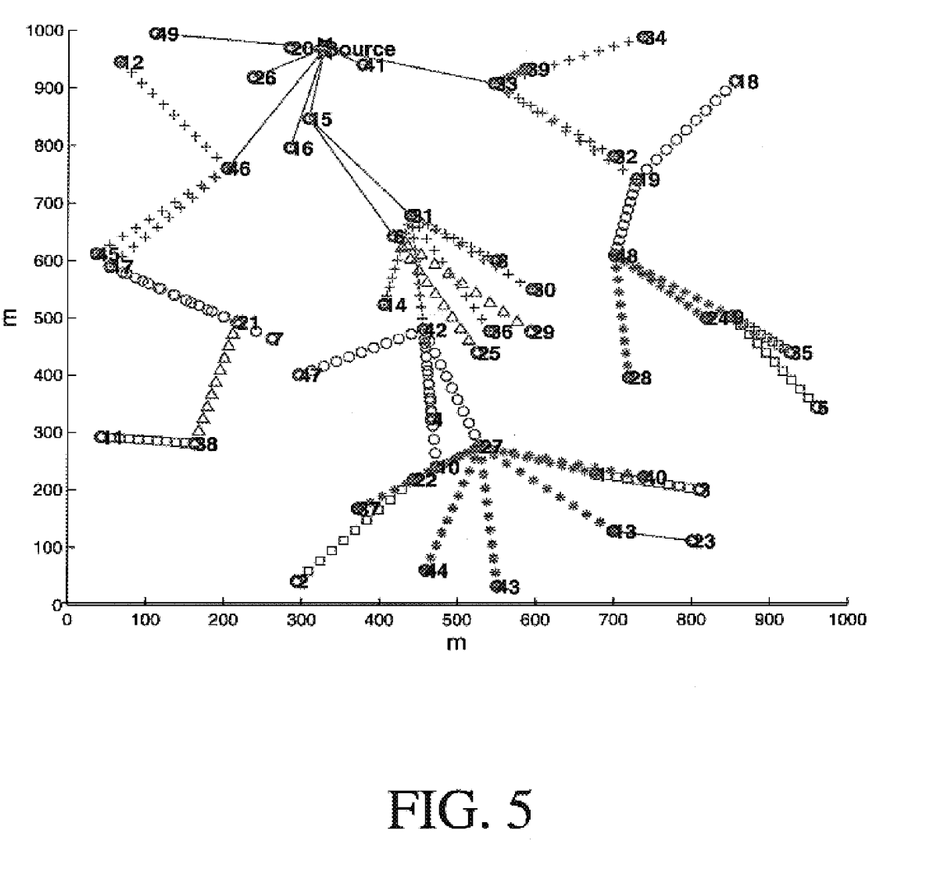
FIG. 5 is a multicast tree diagram depicting a simulated initial multicast tree, where the nodes are mobile with speeds of 10 km/h, and where the source node is also mobile.
Figure 6:
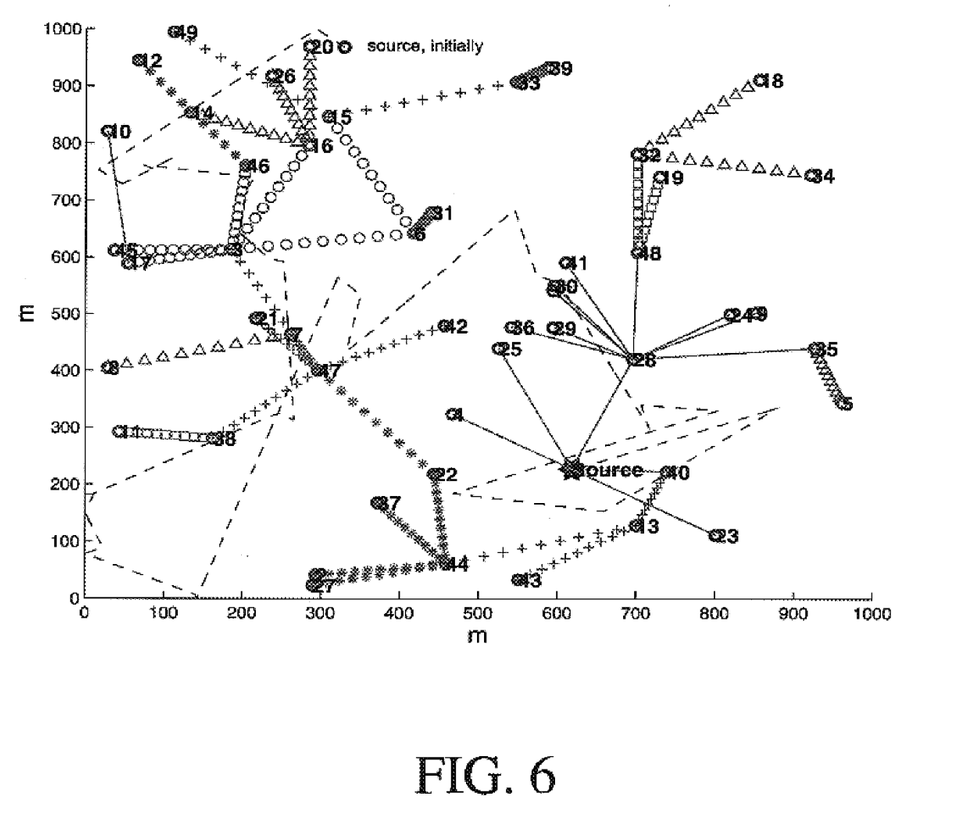
FIG. 6 is a final multicast tree diagram depicting the final multicast tree structure resulting from operating the simulated multicast tree depicted in FIG. 5 for a period of 28 minutes.
Figure 7:
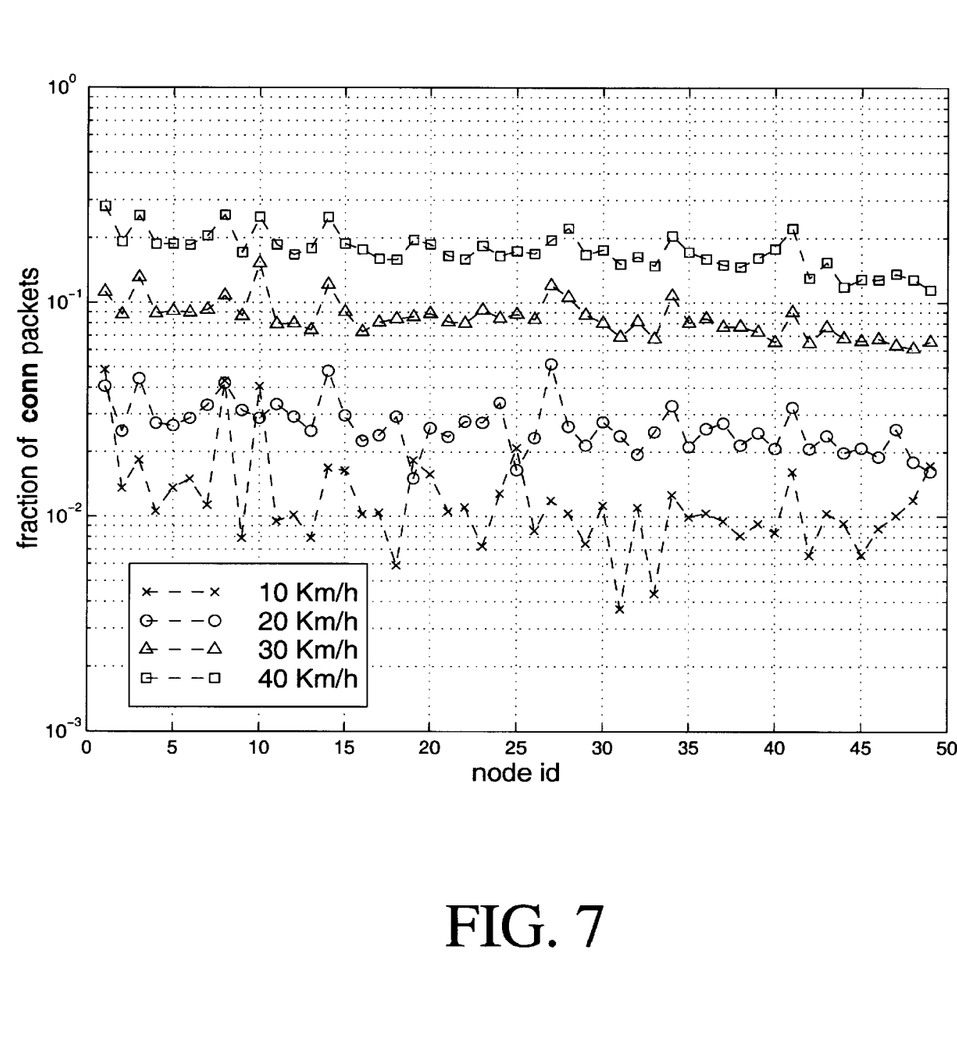
FIG. 7 is a graph depicting the percentage of signaling slots used for transmitting connect requests versus node speed for a plurality of nodes.
Figure 8:
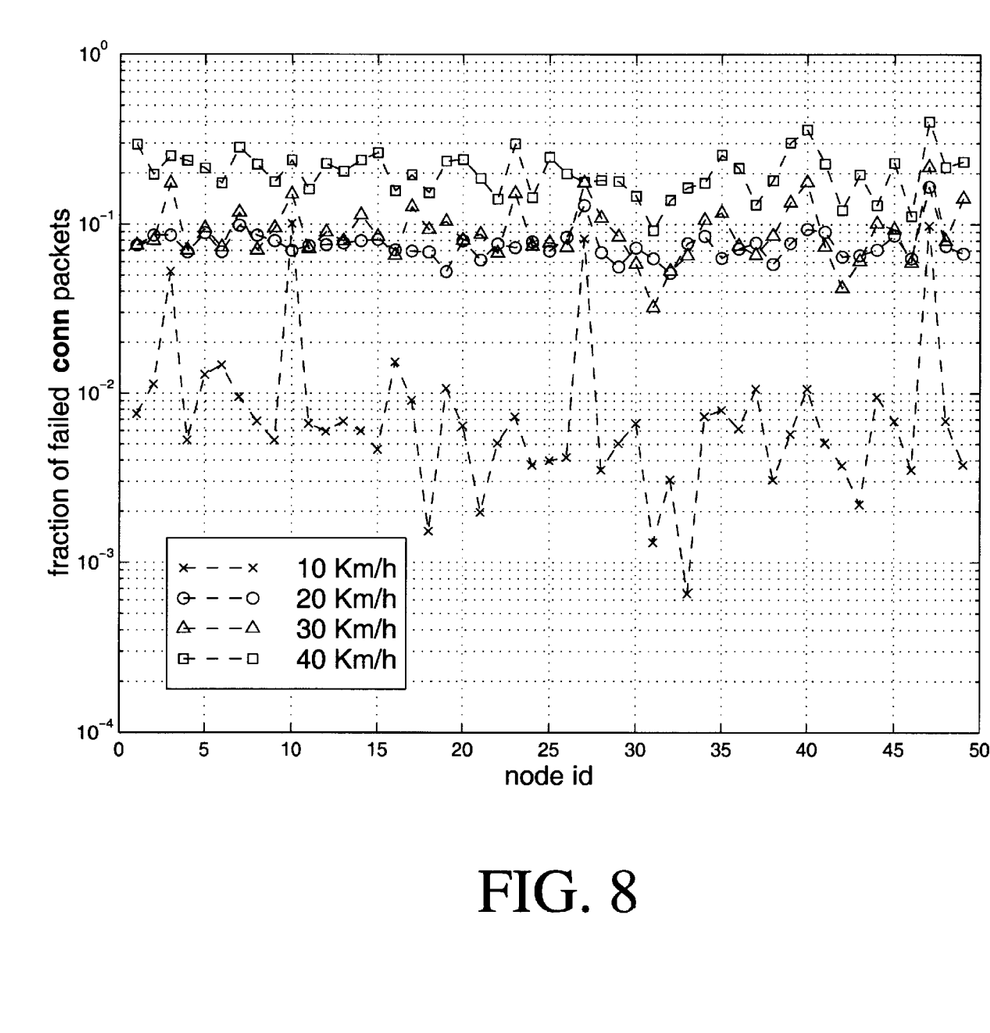
FIG. 8 is is a graph depicting the percentage of failed connect requests versus node speed for a plurality of nodes.

Performance of the present invention was evaluated using Parsec, a C-based, parallel simulation language developed by the University of California at Los Angeles. Fifty nodes were considered dispersed in an area of one square kilometer. Colors were assumed to be TDMA slots. A TDMA frame of 5 ms was assumed, and the periodicity was fixed at p=2, i.e., the source transmits once every two frames. Signaling was done through a separate channel, using a round-robin strategy. The first simulation was performed with all the nodes static, in order to compute the number of slots (colors) required to connect to all of the nodes to the multicast mesh, as a function of the maximum transmission range $d_{max}$. Results from one hundred different node positions were found and averaged, and are presented in FIG. 3. Two cases are considered where η=3 and 4, respectively. This graph shows that, as expected, since, for a given node, the number of neighbors increases with $d_{max}$, fewer links are required to have complete connectivity and hence fewer colors are sufficient. As $d_{max}$ decreases, the average degree of nodes decreases. Thus, more links are needed, more cases of clashes occur, and the number of colors required for complete connectivity increases. Next, the present invention was evaluated assuming node mobility. The value of $d_{max}$ was fixed at 250 m and the value of η was set at 4. From FIG. 3, it is noted that, on average, 6 slots per frame were required. It was assumed that out of the 50 nodes, 10 nodes are mobile and that all mobile nodes move with the same speed. The nodes were each assumed to move with random directions (an angle is chosen between 0 and 360 degrees) and along straight lines. Then nodes were also each assumed to take on a new random direction after a random interval, which was exponentially distributed with a mean 1 minute. Finally, nodes that reach the boundary of the roaming area were assumed to simply bounce back into the area by choosing a new random direction. Round-robin signaling was done via a separate channel, which was assumed to consume about 5% of the data bandwidth. The simulations lasted for 2 million time-slots and the results were averaged for 7 different combinations of mobile nodes. FIG. 4 presents results in the form of percentage of multicast data packets received versus speed of the mobiles. Two cases were considered; where the source node was static and where it was mobile. Note that if the source node was static, the throughput remained very high (90% of the data packets were received properly) even at high speeds. However, when the source node was mobile, the throughput suffered. This may be attributed to the fact that a much larger number of multicast group members will need to reconnect and a large portion of the multicast structure needs to be dynamically rebuilt more frequently. If only nodes that are receiving members of the multicast mesh are mobile, the throughput was very high (greater than 90% of the data packets were received properly). FIG. 5 through FIG. 11 depict the initial and final multicast structures (in this case trees) for an example wherein nodes are mobile with speeds of 10 Km/h and the source node itself is mobile. Note that the other mobile nodes are nodes 1, 3, 8, 10, 14, 27, 28, 34, and 41, as may be seen from FIG. 5. In FIG. 6, the path of the source is also shown. For this example, FIG. 7, presents the percentage of signaling slots that are used for transmitting con packets (i.e. connect requests) and FIG. 8 represents the fraction of failed con packets (i.e. those con packets for which a connection was not established). For low speeds this overhead is fairly low (of the order of 5%, representing the percent of time during which nodes are disconnected). However, it significantly increases (20%) if the nodes are highly mobile. It was observed that for high speeds, all nodes lose connections often and incur a large number of failed requests. However, for low speeds the mobile nodes are those that incur a large number of failed requests. It is to be noted that this overhead is the same for every node, i.e., only localized signaling is involved. Hence the present invention is scalable.

What is claimed is:

1. A method for bandwidth reservation for real-time traffic in a wireless ad-hoc network including a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node, the method comprising the steps of:

a. periodically transmitting a disconnected maintenance packet from each disconnected node, with each disconnected maintenance packet including the disconnected maintenance packet transmitting node ID, the node ID of a parent node from which the disconnected node seeks to receive, the frame position fp of the disconnected maintenance transmitting node, and the color in which the disconnected maintenance packet transmitting disconnected node seeks to receive;

b. periodically transmitting a connected maintenance packet from each connected node, with each connected maintenance packet including the node ID of the connected maintenance packet transmitting node, the node ID of the parent node from which connected node is currently receiving, the frame position fp of the node transmitting the connected maintenance packet, the color in which the connected maintenance packet transmitting node receives, a set of the usable colors in which the connected node may transmit, and a set of unusable colors in which the connected node is prohibited from transmitting;

c. periodically transmitting a temporarily disconnected maintenance packet from each temporarily disconnected node, with each temporarily disconnected maintenance packet including the node ID of the temporarily disconnected maintenance packet transmitting node, the node ID of the parent node from which temporarily disconnected node seeks to receive, the frame position fp of the node transmitting the temporarily disconnected maintenance packet, the color in which the temporarily disconnected maintenance packet transmitting node seeks to receive, a set of the usable colors in which the temporarily disconnected node is transmitting, and a set of unusable colors in which the temporarily disconnected node is prohibited from transmitting;

d. receiving, at each particular node of the plurality of nodes, the maintenance packets from all nodes within a transmission range of the particular node;

e. using the maintenance packets received at each particular node to update the set of usable colors and the set of unusable colors for the particular node, where the set of usable colors for the particular node is defined as the complement of the set of unusable colors, and where the set of unusable colors of a first node Na having frame position fpa includes color ca if there is at least one other node Nb within transmit range of the first node Na, having frame position fpb, where Nb is not a child of node Na, where Nb receives at color ca, and where (fpa+1) mod p=fpb mod p where p represents the data period p; and f. establishing data connections for the disconnected nodes Nd and temporarily disconnected nodes Nd, where a node Nd can connect to a node Nc with color cd within a transmission range of the node Nd, and with a minimum frame position fpc=fpd−1 only if node Nc can transmit at color cd, where color cd=color ca as determined in step e, and only if color cd is not a transmit color of any other node Nk with frame position fpk within the transmission range of the first node Nd, such that fpc mod p=fpk mod p where p represents the data period p;

g. periodically repeating steps a through f to update the ad-hoc network.

2. A method for bandwidth reservation for real-time traffic in a wireless ad-hoc network as set forth in claim 1, wherein the colors are channels developed from combinations selected from the group consisting of TDMA, CDMA, and FDMA schemes.

3. A wireless ad-hoc network developed and maintained by the method of claim 1.

4. A wireless ad-hoc network including a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node, said wireless ad-hoc network developed and maintained by the method of claim 1.

5. A wireless ad-hoc network developed and maintained by the method of claim 2.

6. A wireless ad-hoc network including a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node, said wireless ad-hoc network developed and maintained by the method of claim 2.

7. A method for bandwidth reservation for real-time traffic in a wireless ad-hoc network including the steps of:

a. providing a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node;

b. periodically transmitting a disconnected maintenance packet from each disconnected node, with each disconnected maintenance packet including the disconnected maintenance packet transmitting node ID, the node ID of a parent node from which the disconnected node seeks to receive, the frame position fp of the disconnected maintenance transmitting node, and the color in which the disconnected maintenance packet transmitting disconnected node seeks to receive;

c. periodically transmitting a connected maintenance packet from each connected node, with each connected maintenance packet including the node ID of the connected maintenance packet transmitting node, the node ID of the parent node from which connected node is currently receiving, the frame position fp of the node transmitting the connected maintenance packet, the color in which the connected maintenance packet transmitting node receives, a set of the usable colors in which the connected node may transmit, and a set of unusable colors in which the connected node is prohibited from transmitting;

d. periodically transmitting a temporarily disconnected maintenance packet from each temporarily disconnected node, with each temporarily disconnected maintenance packet including the node ID of the temporarily disconnected maintenance packet transmitting node, the node ID of the parent node from which temporarily disconnected node seeks to receive, the frame position fp of the node transmitting the temporarily disconnected maintenance packet, the color in which the temporarily disconnected maintenance packet transmitting node seeks to receive, a set of the usable colors in which the temporarily disconnected node is transmitting, and a set of unusable colors in which the temporarily disconnected node is prohibited from transmitting;

e. receiving, at each particular node of the plurality of nodes, the maintenance packets from all nodes within a transmission range of the particular node;

f. using the maintenance packets received at each particular node to update the set of usable colors and the set of unusable colors for the particular node, where the set of usable colors for the particular node is defined as the complement of the set of unusable colors, and where the set of unusable colors of a first node Na having frame position fpa includes color ca if there is at least one other node Nb within transmit range of the first node Na, having frame position fpb, where Nb is not a child of node Na, where Nb receives at color ca, and where (fpa+1) mod p=fpb mod p where p represents the data period p;

g. establishing data connections for the disconnected nodes Nd and temporarily disconnected nodes Nd, where a node Nd can connect to a node Nc with color cd within a transmission range of the node Nd, and with a minimum frame position fpc=fpd−1 only if node Nc can transmit at color cd, where color cd=color ca as determined in step e, and only if color cd is not a transmit color of any other node Nk with frame position fpk within the transmission range of the first node Nd, such that fpc mod p=fpk mod p where p represents the data period p; and h. periodically repeating steps a through f to update the ad-hoc network.

8. A method for bandwidth reservation for real-time traffic in a wireless ad-hoc network as set forth in claim 7, wherein the colors are channels developed from combinations selected from the group consisting of TDMA, CDMA, and FDMA schemes.

9. A wireless ad-hoc network developed and maintained by the method of claim 7.

10. A wireless ad-hoc network developed and maintained by the method of claim 8.

* * * * *